United States Patent [19]

Träubel et al.

[11] Patent Number: 5,268,416
[45] Date of Patent: Dec. 7, 1993

[54] OLIGOURETHANES AS FORMING AGENTS FOR NON-AQUEOUS PIGMENT PREPARATIONS

[75] Inventors: Harro Träubel, Leverkusen; Hans-Werner Müller, Cologne; Fritz Novotny, Bergisch Gladbach, all of Fed. Rep. of Germany

[73] Assignee: Bayer Aktiengesellschaft, Leverkusen, Fed. Rep. of Germany

[21] Appl. No.: 865,522

[22] Filed: Apr. 9, 1992

[30] Foreign Application Priority Data

Apr. 16, 1991 [DE] Fed. Rep. of Germany ....... 4112326

[51] Int. Cl.$^5$ ............................ C08J 3/20; C08K 3/00; C08L 75/04
[52] U.S. Cl. ..................................... 524/590; 524/589; 528/44; 528/53; 528/61; 528/65; 528/66; 528/76; 528/82
[58] Field of Search ................ 524/590, 839, 840, 589; 528/44, 53, 61, 65, 66, 76, 82

[56] References Cited

U.S. PATENT DOCUMENTS

| | | | |
|---|---|---|---|
| 3,900,688 | 8/1975 | Thoma et al. | 428/246 |
| 3,935,087 | 1/1976 | Jerabek et al. | 523/415 |
| 4,230,812 | 10/1980 | Tork et al. | 526/320 |
| 4,248,756 | 2/1981 | König et al. | 260/31.2 N |
| 4,310,493 | 1/1982 | Pisaric et al. | 422/135 |
| 4,507,427 | 3/1985 | Potter et al. | 524/591 |
| 4,524,172 | 6/1985 | Steinberger et al. | 524/506 |
| 4,571,417 | 2/1986 | Thoma et al. | 525/63 |
| 4,812,492 | 3/1989 | Eckes et al. | 523/351 |

FOREIGN PATENT DOCUMENTS

| | | |
|---|---|---|
| 341053 | 11/1989 | European Pat. Off. . |
| 395955 | 11/1990 | European Pat. Off. . |
| 3309992 | 9/1984 | Fed. Rep. of Germany . |
| 51-48654 | 12/1976 | Japan ................................. 524/590 |
| 1176479 | 1/1970 | United Kingdom . |

*Primary Examiner*—Paul R. Michl
*Assistant Examiner*—Patrick Niland
*Attorney, Agent, or Firm*—Joseph C. Gil; Richard E. L. Henderson

[57] ABSTRACT

Oligourethanes containing both anionic and cationic groups may be used as forming agents for superior non-aqueous pigment preparations.

8 Claims, No Drawings

OLIGOURETHANES AS FORMING AGENTS FOR NON-AQUEOUS PIGMENT PREPARATIONS

This invention relates to the use of certain oligourethanes as forming agents for non-aqueous pigment preparations. The terms "pigments" and "pigment preparations" in the context of this invention include matting agents and their preparations. The new pigment preparations obtainable by means of the oligourethanes to be used according to the invention are eminently suitable for the pigmentation (or matting) of dressing agents for leather and leather imitations and textile coating compounds. "Forming agents" within the meaning of this invention refer to the binders of the pigment preparations but not necessarily to the complete binders of the dressing agents or of the textile coating compounds.

Dressing agents and textile coating compounds (e.g. textile printing pastes) in most cases contain their own binders. The forming agent of the pigment preparation serves to facilitate the incorporation of the pigment in the dressing agent or in the textile coating compound. The forming agents must not deleteriously affect the properties of the dressing agents and textile coating compounds. Non-aqueous systems are mainly used for the dressing of leather and the printing of textiles. Non-aqueous pigment preparations for colouring the dressing agents and textile coating compounds used are not only required to be free from migrating components and to have a high pigment content with low viscosity, high stability and good compatibility with the other components of the dressing agents or textile coating compounds but are also required not to impair the properties of the dressing agents and textile coating compounds nor the properties of the finished articles in which these agents have been used. Thus, for example, they must not deleteriously affect the abrasion resistance, bending strength, wet adherence, ironing and embossing qualities, swelling properties and softness and hardness at different temperatures (and hence also the low temperature strength).

It is known to use quaternised oligourethanes (EP-A 0 341 053) based on tall oil as pigment binders. The produces are however very hard and display poor film-forming properties.

DE-OS 27 21 985 discloses urethane- and/or urea-containing polyisocyanate polyaddition products containing cationic and anionic groups and their use as coating compounds. The polyaddition products can be applied in the form of aqueous dispersions but also as solutions or dispersions in organic polyhydroxyl compounds (e.g. in ethylene glycol). Aqueous dispersions of the polyaddition products are recommended as sizes for pigments. Thus no suggestions could be found in DE-OS 27 21 985 for solving the problem of preparing pigment forming agents in organic solvents with excellent properties.

It has surprisingly been found that oligourethanes which are dissolved or dispersed in organic solvents and are obtainable from NCO prepolymers and aminoalcohols and contain anionic (or potentially anionic) and cationic (or potentially cationic) groups in specific ratios, are superior to the non-aqueous forming agents of the prior art.

In this connection potentially ionic groups are understood to be, for example, acid groups and amino groups which are capable of forming ionic groups by neutralisation of protonation in water or by quaternisation or betaine formation.

The present invention thus relates to the use of oligourethanes which have molecular weights in the range from 5000 to 50,000, are free from primary and secondary amino groups and contain anionic and cationic groups, the quantity of anionic groups amounting to 0.2 to 0.8 mol, preferably 0.25 to 0.7 mol per 1000 g of oligourethane and the molar ratio of anionic/cationic groups amounting to 0.8 to 4, preferably 0.9 to 3.6, as forming agents for non-aqueous pigment preparations.

The molecular weights mentioned for the oligourethanes are average molecular weights and are calculated from the nature and quantity of the starting components. In the context of the invention the term "oligourethanes" includes "oligourethane ureas".

The oligourethanes to be used according to the invention are preferably reaction products of
I) polyisocyanates,
II) hydroxyl compounds and
III) aminoalcohols.

Suitable organic polyisocyanates I) are aliphatic, cycloaliphatic, araliphatic, aromatic or heterocyclic polyisocyanates such as those described, for example, by W. Siefken in Liebigs Annalen der Chemie 562, pages 75–136.

Preferred polyisocyanates I) are compounds of the formula $Q(NCO)_n$ having an average molecular weight below 800, n denoting a number from 2 to 4 and Q denoting an aliphatic $C_2$–$C_{14}$-hydrocarbon group, a cycloaliphatic $C_6$–$C_{15}$-hydrocarbon group, an araliphatic $C_7$–$C_{15}$-hydrocarbon group or a heterocyclic $C_2$–$C_{12}$ group having 1 to 3 hetero atoms selected from oxygen, sulphur and nitrogen, for example: (i) Diisocyanates such as ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-2-isocyanatomethyl-cyclopentane, 1-isocyanato-3,3,5-trimethyl-5-isocyanatomethyl-cyclohexane, 2,4- and 2,6-hexahydrotolylene diisocyanate and any mixtures of these isomers, hexahydro-1,3- and/or -1,4-phenylene diisocyanate, perhydro-2,4'- and/or -4,4'-diphenylmethane-diisocyanate, 1,3- and 1,4-phenylene-diisocyanate, 2,4- and 2,6-tolylenediisocyanate and any mixtures of these isomers, diphenylmethane-2,4'- and/or -4,4'-diisocyanate, naphthalene-1,5-diisocyanate, polyisocyanates containing uretdione groups, e.g. bis-(6-isocyanatohexyl)-uretdione or the dimer of 1-isocyanato-3,3,5-trimethyl-5-isocyanatomethylcyclohexane containing the uretdione structure and any mixtures of the above-mentioned polyisocyanates; (ii) trifunctional and higher functional polyisocyanates such as the isomers of triisocyanato-triphenyl thiophosphate series and their mixtures; the isomers of the triisocyanato triphenylmethane series (such as triphenylmethane-4,4',4"-triisocyanate) and their mixtures; biurets and isocyanurates or tris-urethanes of hexamethylene diisocyanate, of isophorone diisocyanate or of other aliphatic isocyanates, and polyphenyl-polymethylene polyisocyanates as obtained by aniline/formaldehyde condensation followed by phosgenation. Aliphatic and cycloaliphatic polyisocyanates are preferred.

The compounds for reaction with these polyisocyanates I) may be mono- and especially polyhydroxyl compounds II) having from 2 to 8, preferably 2 or 3 hydroxyl groups per molecule and an (average) molecular weight of up to 10,000, preferably up to 6000. Both low molecular weight polyhydroxyl compounds having molecular weights of from 62 to 499 and relatively high molecular weight polyhydroxyl compounds having average molecular weights of at least 500, preferably at least 1000 may be used, such as those described in detail in the above-mentioned publications.

Low molecular weight polyhydroxyl compounds II ("chain lengthening agents") include a wide variety of diols such as, for example, a) alkanediols such as ethylene glycol, propylene glycol-(1,3) and propylene glycol-(1,2), butanediol-(1,4), pentanediol-(1,5), dimethylolpropanediol-(1,3) and hexanediol-(1,6):

b) ether diols such as diethylene glycol, triethylene glycol and 1,4-phenylene-bis-($\beta$-hydroxyethylether);

c) ester diols corresponding to the general formulae

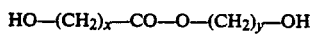
HO—(CH$_2$)$_x$—CO—O—(CH$_2$)$_y$—OH and

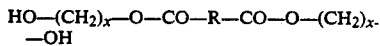
HO—(CH$_2$)$_x$—O—CO—R—CO—O—(CH$_2$)$_x$—OH in which
R denotes an alkylene or arylene group having 1 to 10, preferably 2 to 6, carbon atoms,
x=2 to 6 and
y=3 to 5, e.g. $\delta$-hydroxybutyl-$\epsilon$-hydroxy-caproic acid ester, $\omega$-hydroxyhexyl-$\gamma$-hydroxybutyric acid ester, adipic acid-($\beta$-hydroxyethyl)ester and terephthalic acid-bis-($\beta$-hydroxyethyl)ester.

Relatively high molecular weight polyhydroxyl compounds II include those known per se in polyurethane chemistry, such as hydroxypolyesters, hydroxypolyethers, hydroxypolythioethers, hydroxypolyacetals, hydroxypolycarbonates and/or hydroxypolyester amides, preferably those having average molecular weights of from 600 to 4000, most preferably those with average molecular weights of from 800 to 2500. Polyether polyols and polyester polyols are particularly preferred.

Ethylene oxide polyethers II having an average of 2 to 3 hydroxyl groups per molecule and an average molecular weight of from 250 to 2500 are particularly preferred; these may also contain polypropylene oxide units. In a particularly preferred embodiment, ethylene oxide polyethers are used in a quantity resulting in an oligourethane having 5 to 15, preferably 6 to 10% by weight of polyethoxy groups, based on the oligourethane.

The hydroxyl group-containing polyesters II may be, for example, reaction products of polyhydric, preferably dihydric alcohols, optionally together with trihydric alcohols, with polybasic, preferably dibasic carboxylic acids. Instead of using free polycarboxylic acids, the corresponding polycarboxylic acid anhydrides or corresponding polycarboxylic acid C$_1$-C$_4$-alkyl esters or mixtures thereof may be used for the preparation of the polyesters. The polycarboxylic acids may be aliphatic, cycloaliphatic, aromatic and/or heterocyclic and may be substituted, e.g. by halogen atoms, and/or unsaturated.

The following are examples of such polycarboxylic acids: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, terephthalic acid dimethylester and carbonic acid.

The following are examples of suitable polyhydric alcohols: Ethylene glycol, propylene glycol-(1,2) and-(1,3), butylene glycol-(1,4) and —(2,3), hexanediol-(1,6), octanediol-(1,8), neopentyl glycol, cyclohexane dimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methyl glycoside, as well as diethylene glycol, triethylene glycol, tetraethylene glycol, dipropylene glycol, dibutylene glycol and polybutylene glycols.

Particularly preferred polyesters II contain residues of polyethylene glycols (e.g. di-, tri- and/or tetraethylene glycol) with molecular weights of from 106 to 200 incorporated in their structure. Such modified polyesters are particularly advantageous when no polyethylene glycols are used for the preparation of the oligourethanes used according to the invention. The quantity of built-in polyethylene glycol groups is preferably chosen so that the ethoxy group content of the oligourethane to be used according to the invention is from 5 to 50% by weight, preferably from 20 to 40% by weight.

The components incorporated for the introduction of ionic groups into the oligourethanes may, quite generally speaking, consist of cationic and anionic starting components of the type described for the preparation of oligourethanes, such as, for example, dihydroxyl compounds or diisocyanates containing ionic groups.

Preferred starting materials for the incorporation of anionic groups in the oligourethanes to be used according to the invention include dihydroxycarboxylic and sulphonic acids and their salts.

Preferred dihydroxycarboxylic acids have 4 to 12 carbon atoms per molecule such as, for example, dihydroxymaleic acid, dihydroxyfumaric acid, tartaric acid, 2,3-, 2,4-, 2,5-, 2,6-, 3,4- and 3,5-dihydroxybenzoic acid, 4,6-dihydroxyisophthalic acid, 2,8-dihydroxynaphthoic acid-(3) and in particular compounds corresponding to the formula

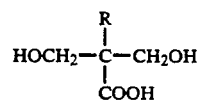

wherein R stands for C$_1$-C$_4$-alkyl, in particular methyl (methylolpropionic acid).

Preferred dihydroxysulphonic acids and their salts correspond to the following formula

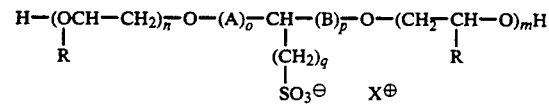

wherein
A and B denote, independently of one another, divalent aliphatic hydrocarbon groups having 1 to 6 carbon atoms, R stands for hydrogen, an aliphatic hydrocarbon group having 1 to 4 carbon atoms or a phenyl group, $X^{\oplus}$ stands for an alkali metal cation or an optionally substituted ammonium group, n and m denote, independently of one another, zero or numbers from 1 to 30, o and p stand for zero or 1 and q stands for zero, 1 or 2.

Such diols are described, for example, in DE-OS 2 446 440.

The most preferred sulphonate diol is the product of addition of sodium bisulphite to butene-2-diol-1,4.

The diisocyanates containing (potentially) ionic groups include, for example, modified isocyanates as described in DE-OS 1 939 911, 2 227 111, 2 359 613 and 2 359 614; for example, aromatic diisocyanates containing free sulphonic acid groups obtainable by the sulphonation of aromatic diisocyanates, in particular 2,4-diisocyanatotoluene or 4,4'-diisocyanatodiphenylmethane. Diisocyanates which react as quaternising agents with amines may also be used as compounds containing (potentially) ionic groups, e.g. chlorohexylisocyanate, m-chloromethylphenylisocyanate, 2,4-diisocyanatobenzyl chloride or isocyanates containing alkyl sulphonic acid ester groups, e.g. 4-isocyanatobenzene sulphonic acid methyl ester, since their reaction with, for example, tertiary amines also introduces cationic groups bound in homopolar form into the oligourethane.

Amino alcohols III for the synthesis of the oligourethanes to be used according to the invention include monohydric alcohols but are preferably diols or triols, in particular alkoxylated aliphatic, cycloaliphatic, aromatic and heterocyclic amines, e.g. N,N-dimethylethanolamine, N-methyldiethanolamine, N-butyldiethanolamine, N-oleyldiethanolamine, N-cyclohexyldiethanolamine, N-methyldiisopropanolamine, N-cyclohexyldiethanolamine, N-methyldiisopropanolamine, N-cyclohexyldiethanolamine, N,N-dioxyethylaniline, N,N-dioxyethyl-m-toluidine, N,N-dioxyethyl-p-toluidine, N,N-dioxypropylnaphthylamine, dioxyethylpiperazine, polyethoxylated butyldiethanolamine, polypropoxylated methyldiethanolamine (the average molecular weight being preferably from 250 to 3000 in the case of polyalkoxylated products). Amino alcohols III) having at least one tertiary nitrogen atom and at least 2 hydroxyl groups per molecule are particularly preferred. Among these, aliphatic products are again preferred on account of the high light fastness required.

Cationic groups within the meaning of the claims include the groups incorporated in a homopolar form in the oligourethane but not the ammonium groups attached in heteropolar form which may be produced from the neutralisation of the potentially anionic groups.

One possible explanation of the effect according to the invention, at least within the most preferred range, namely when the starting products are used in such arithmetically equivalent ratios that the number of isocyanate groups corresponds exactly to the number of isocyanate reactive groups, is that isocyanate groups are lost by side reactions so that a slight excess of isocyanate reactive groups results If the compounds used as binders for leather dressings or textile coating compounds are capable of reacting with isocyanate reactive groups (e.g. polyisocyanates), then the oligourethanes may be chemically incorporated in the leather dressing or textile printing layers by way of the excess isocyanate reactive groups. If one assumes that from 0.1 to 0.4% of the isocyanate groups are lost in the reaction of polyisocyanates, hydroxyl compounds and amino alcohols, one may expect an excess of isocyanate reactive groups of about 25 to 100 mmol per 1000 g of oligourethane to result.

The oligourethanes are preferably produced in two steps: By reacting polyisocyanate I and hydroxyl compound II in an NCO/OH equivalent ratio of higher than 1.5, and preferably higher than or equal to 2, an isocyanate prepolymer is produced which is reacted with NCO-reactive compounds (e.g. with hydroxyl compound II and aminoalcohol III) in such a ratio that the number of NCO-reactive groups is at least equal to the number of NCO groups.

The oligourethanes to be used according to the invention may be prepared discontinuously or continuously.

The equivalent ratio of isocyanate groups to isocyanate reactive groups of all the starting components taking part in the synthesis of the polyaddition products according to the invention is generally between 0.8:1 and 1 2:1, and preferably between 0.9:1 and 1:1.

The oligourethanes to be used according to the invention can contain hydroxyl groups or free or blocked isocyanate groups as terminal groups. Preferred terminal groups are sterically hindered free or blocked isocyanate groups. Blocked isocyanate groups as terminal groups are preferably used in cases where the substrate does not suffer any damage at the temperatures necessary for deblocking.

The oligourethanes to be used according to the invention are generally produced in the absence of water or in the presence or absence of organic solvents. If no organic solvents are used the oligourethanes are dispersed or dissolved in an organic solvent after their production.

Such organic solvents include, for example, alcohols such as isobutanol, cyclohexanol, tert.-butanol, diacetone alcohol, ethyl glycol, glycol monomethyl ether, ketones, such as methyl ethyl ketone, cyclohexanone, esters such as butyl acetate, ethylene or propylene glycol diacetate, phthalic acid esters such as dimethyl phthalate, dibutyl phthalate, dioctyl phthalate, phosphoric acid esters such as tricresyl phosphate, adipic acid esters such as dibutyl adipate, alkyl sulphonic acid esters such as phenyl or tolyl pentadecanesulphonate, i.e. products of the kind generally known, for example, for plasticising nitrocellulose or PVC, or methoxy or ethoxypropyl acetate or acid amides, such as dimethyl formamide or methyl pyrrolidone and to a certain extend hydrocarbons such as benzene, toluene or xylene, and mixtures of these products. Cyclohexanone, dimethylformamide, propylene glycol diacetate and methoxypropyl acetate are preferred.

Solvents having a boiling point $\geqq 120°$ C. are particularly preferably used.

Solvents free of OH or NH groups are preferably used. In one particular embodiment "solvents" of the kind customarily employed, for example, for plasticising PVC, are used; i.e. solvents which can remain in the substrate and do not have to be evaporated off.

The non-aqueous pigment preparations contain A) pigment and B) oligourethane generally in a weight ratio of 1:(0.05 to 10), preferably 1:(0.1 to 6). The non-aqueous pigment preparations can also contain C) additional additives, preferably organic solvents, in quantities of 0 to 50, preferably 0.2 to 20 parts by weight per part by weight of pigment.

In addition to organic solvents additives C) also includes formulating agents, defoaming agents and thickening agents.

The pigments can be dispersed in a simple manner with the aid of the oligourethanes dispersed in organic solvents by milling—for example with the aid of a rotor-stator mill, or a bead or ball mill. The particle size of the milled pigments and the colour yield are very favourable.

There is virtually no limitation to the choice of suitable pigments for the non-aqueous pigment preparations; they may be inorganic or organic. Suitable organic pigments include, for example, those of the azo, anthraquinone, azoporphine, thioindigo, dioxazine, naphthalene tetracarboxylic acid and perylene tetracarboxylic acid series as well as laked dyes such as calcium, magnesium or aluminum lakes of dyes containing sulphonic acid and/or carboxylic acid groups; a large number of these is known, for example, from Colour-Index, 2nd Edition. Examples of suitable inorganic pigments (or matting agents) are, for example, zinc sulphides, titanium dioxides, ultramarines, iron oxides, nickel and chromium compounds, carbon blacks and silicon dioxides or aluminium oxides.

The products may be added in known manner to the appropriate dressing preparations (e.g. based on solutions of polyacrylates and/or polyurethanes and/or cellulose esters, as described, for example, in Ullmanns Enzyklopädie der technischen Chemie, 4th Edition, Volume 16, Verlag Chemie, Weinheim/New York 1978, pages 159 et seq. and the literature references cited therein) and applied to the leather by casting, spraying or printing. They may also be used in the coating of textiles for colouring organic solutions or acrylate and/or vinyl polymers and/or polyurethanes, in which case they are applied to a separating paper by spread coating in known manner, usually in several layers, and then transferred from the paper to the textile. Their use in reactive systems, such as in ®Baygen (trade name of Bayer AG; S. W. Speicher, J. Soc. Leather Trade Chem. 1961, 104–124) or in ®Levacast (trade name of Bayer AG; H. Träubel, Das Leder 1974, 162 et seq.) is also possible. The interlayers or the (textile) coating compositions can also be subsequently crosslinked by means of polyisocyanates, epoxides or aziridine derivatives etc., in order to render them water-resistant and even more resistant to solvents. Textiles may also be directed coated by spread coating with polyurethane and/or polyacrylate solutions coloured according to the invention. Pigment printing pastes conventionally used for textile printing and applied to the textile by screen printing may also be coloured with these pigment preparations.

Organic leather dressing agents which can be coloured with the pigment preparations according to the invention are described for example in DE-OS 1 174 937 and 1 278 064. Almost all binders which are dissolved in inorganic solvents can be pigmented with these pigment preparations. They are particularly suitable for pigmenting aromatic and aliphatic polyurethane one-component systems and amine-containing two-component systems and for compositions based on cellulose derivatives of the kind used for the dressing of leather or leather substitutes The pigment preparations are selected according to the required colour effect If a high covering power is required, preparations of inorganic pigments are used. If, on the other hand, the treated substrate is required to display a glazed colour of high brilliance preparations containing organic pigments are generally used Consideration is also given to the fastness properties required of the pigment, such as light and migration fastness, heat resistance, etc.

These novel pigment preparations are particularly suitable for use in reactive polyurethane systems of the kind used for example in the 2-component process according to DE-OS 33 09 992 or in "High-Solid Systems" according to DE-OS 32 39 900.

Compared with the known pigment preparations those according to the invention have the advantage that they can be prepared in an extremely simple manner, are universally applicable and do not have any negative effect on the properties of the dressing agents and textile coating compounds to be pigmented or the substrates.

Oligourethanes having softening points of between $-40°$ C. and $+180°$ C. are particularly preferred. After the solvents optionally employed have been evaporated off in drying tunnels non-porous films are formed at room temperature from the solutions of the oligourethanes. This is one of the reasons why the dressings are not tacky and are highly resistant to rubbing when subjected to heat The dressings also display high low temperature resistance and high flexing resistance under wet and dry conditions. Neither do the oligourethanes migrate from the coating or dressing systems. The addition of plasticisers instead of solvents of the adipic acid or phthalic acid ester type prevents hardening; if these products are used in quantities of below 30% by weight, and preferably below 10% by weight, based on the coating compound, the compounds do not migrate.

Where mixtures of various pigments are used in pigment preparations containing binders based on cellulose or polyvinyl acetate, flotation, in particular of the organic pigments, frequently takes place. This is avoided by the pigment preparations according to the invention and their compatibility with the various coating agents is improved, so that they can be universally used for colouring binders, e.g. for use in textile printing.

The oligourethanes to be used according to the invention are free from N-methylol groups and groups which form by the reaction of such N-methylol groups with reactive groups. The pigment preparations produced with the aid of the oligourethanes to be used according to the invention and the coatings obtained with these pigment preparations do not therefore exude formaldehyde and are consequently friendly to the environment.

Unless otherwise mentioned, the percentages in the following examples are based on weight; all parts are parts by weight.

EXAMPLES

The following auxiliary agents were used

| | |
|---|---|
| Aqueous ammonia; 25% | |
| ® BAYDERM Fix CI: | Isocyanate-based cross-linking agent of Bayer AG |
| ® BAYDERM Fix PCL: | Carbodiimide-based cross-linking agent of Bayer AG |
| ® Elftex 125: | Carbon black of Cabot Company, D-6450 Hanau |
| ® BAYFERROX 180 M: | Iron oxide red of Bayer AG |
| ® BAYERTITAN R-KB2: | Titanium dioxide (rutile type) of Bayer AG |

I. PREPARATION OF THE FORMING AGENT

EXAMPLE 1

308 g (400 mmol OH) of a hexanediol-neopentyl-glycolpolyadipate (OH number 72) were dehydrated in a stirred glass beaker. 8.9 g (200 mmol OH) trimethylol propane and 134 g (200 mmol OH) dimethylol propionic acid were then added with stirring. 177.6 g (1.6 mmol NCO) isophorone diisocyanate were added at 80° C., after which the mixture was kept at 100° C. for 150 minutes. The NCO value fell to 6.3% (theoretical 6.6% NCO).

A mixture of 13.9 g (280 mmol OH) triethanolamine, 20.7 g (280 mmol OH) n-butanol and 24.4 g (280 mmol OH) butanone oxime dissolved in 378 g methoxypropyl acetate was then added, followed by stirring for another 180 minutes. Then titrimetric determination no longer revealed any isocyanate. A 60% oligourethane solution pale yellowish in color with a viscosity of 7,500 mPa.s at 23° C. was obtained. The oligourethane obtainable from this solution was soft and film-forming.

The film obtainable from this oligourethane was tested by comparison with a film according to DE-OS 2 801 817 by knife-coating the solution as such or together with a crosslinking agent and determining the tensile strength of the resulting film:

TABLE 1

| Crosslinking agent | [%] | Tensile strength [mPa] | Elongation at break [%] |
|---|---|---|---|
| — | — | 0.07 | 810 |
| ® BAYDERM Fix CI | 3 | 0.48 | 840 |
| ® BAYDERM Fix CI | 5 | 0.88 | 350 |
| ® BAYDERM Fix PCL | 3 | 0.06 | 1,050 |

TABLE 1-continued

| Crosslinking agent | [%] | Tensile strength [mPa] | Elongation at break [%] |
|---|---|---|---|
| ® BAYDERM Fix PCL | 5 | 0.14 | 800 |

It was not possible to produce an acrylate polymer film corresponding, for example, to Example 1 of DE-OS 2 801 817 in the same way because it was too brittle. Neither did the crosslinking of the acrylate polymer film produce any improvement.

The oligourethane on which this Example is based can be prepared in 2-butanone, ethyl acetate, dimethyl formamide or in cyclohexanone because it is soluble in these solvents.

EXAMPLE 2

Example 1 was repeated with the following changes:

|  | g | mmol OH |
|---|---|---|
| Hexanediol neopentyl glycol polyadipate, OH number 72 | 308 | 400 |
| Trimethylol propane | 8.9 | 200 |
| Dimethylol propionic acid | 13.4 | 200 |
| Isophorone diisocyanate | 178 | 1,600 |
| Dimethyl ethanolamine | 25 | 280 |
| Hexane-1,6-diol | 16.5 | 280 |
| Butanone oxime | 24.4 | 280 |
| Methoxypropyl acetate | 386 | — |

The color of the oligourethane was light and clear; viscosity:3,400 mPa.s/23° C.

The following forming agents were produced in accordance with Example 1:

TABLE 2

| No. | Polyol | [g] | [Mmol OH] | Trimethylol propane [g] | Trimethylol propane [Mmol OH] | Dimethylol propionic acid [g] | Dimethylol propionic acid [Mmol OH] | Isocyanate | [g] | [Mmol NCO] |
|---|---|---|---|---|---|---|---|---|---|---|
| 3 | Polytetrahydrofuran |  |  |  |  | 6.5 |  | Tolylene diisocyanate |  |  |
|  | (OH value 56) | 150 | 300 | — | — |  |  |  |  |  |
|  | (OH value 112) | 50 | 100 | — | — |  | 100 | 2,4/2,6 (80%) | 69.5 | 800 |
| 4 | Hexanediol polyadipate | 350 | 400 | 8.9 | 200 | 13.4 | 200 | Isophorone diisocyanate | 160 | 1,440 |
|  | (OH value 64) |  |  |  |  |  |  | Hexamethylene diisocyanate | 13.2 | 160 |
| 5 | Hexanediol neopentyl glycol polyadipate (OH value 72) | 770 | 1,000 | — | — | 67 | 1,000 | Isophorone diisocyanate | 444 | 4,000 |
| 6 | Hexanediol neopentyl glycol polyadipate (OH value 72) | 308 | 400 | 8.9 | 200 | 13.4 | 200 | Isophorone diisocyanate | 178 | 1,600 |
| 7 | Hexanediol polycarbonate (OH value 60) | 370 | 400 | 8.9 | 200 | 13.4 | 200 | Hexamethylene diisocyanate | 134 | 1,600 |

| No. | Amine | [g] | [mmol OH] | Chain terminator | [g] | [mmol OH] | Butanone oxime [g] | Butanone oxime [mmol OH] | Solvent | [g] | Color | Viscosity [mPa · s/23° C.] |
|---|---|---|---|---|---|---|---|---|---|---|---|---|
| 3 | Methyl diethanolamine | 17.8 | 300 | — | — | — | — | — | Methoxypropyl acetate | 230 | Clear, light | 60,000 |
| 4 | Triethanolamine | 13.9 | 280 | n-Butanol | 20.7 | 280 | 24.5 | 280 | Methoxypropyl acetate | 405 | Light yellow, clear | 3,000 |
| 5 | Triethanolamine | 50 | 1,000 | n-Butanol | 89 | 1,200 | — | — | Methoxypropyl acetate | 950 | Yellowish, clear | 32,000 |
| 6 | N,N-dimethylaminoethanol | 25 | 280 | Hexane-1,6-diol | 16.5 | 280 | 24.5 | 280 | Methoxypropyl acetate | 386 | Clear, light | 3,400 |
| 7 | N-methyl diethanolamine | 11.9 | 200 | Hexane-1,6-diol | 38.3 | 650 | — | — | Cyclohexanone | 390 | Light yellow | 11,000 |

| | |
|---|---|
| olamine | to cloudy |

TABLE 2-continued

II. PREPARATION OF PIGMENT FORMULATIONS

EXAMPLE A1

120 Parts Pigment Yellow 83 (®Novopermgelb HR, a product of Hoechst AG) were stirred into 130 g of the forming agent of Example 1, followed by mixing for 40 minutes in a dissolver 750 g methoxypropylacetate were simultaneously added. The mixture was then passed through a bead mill (bead size 1-2 mm) for an average residence time of 30 minutes. A pigment preparation in which the pigment was very thoroughly dispersed was obtained. The pigment preparation had a viscosity of 2,300 mPa.s at 23° C.

The coloring strength of this preparation was 29% higher than that of a preparation containing a forming agent according to Example 1 of DE-OS 2 801 817.

EXAMPLE A2

Example A1 was repeated as follows:
650 g of white rutile (®Bayer-Titan R-KB 2), 230 g of the forming agent of Example 1 and 120 g methoxypropyl acetate were dispersed in one another for 40 minutes in a dissolver. A white pigment preparation having a viscosity of 4,000 mPa.s at 23° C. was formed.

The following Examples were carried out in accordance with Example A1:

phenylmethane-4,4'-diisocyanate, followed by reaction with butanediol.

EXAMPLE V2

Pigmenting of a Two-Component Polyurethane 8 g of the titanium dioxide pigment preparation of Example A2 were added to a solution of 30 g of a crosslinkable OH-terminated polyurethane and 70 g ethyl acetate while stirring with a high-speed stirrer at a rotational speed of 200 to 300 r.p.m. and with addition of 5 g methyl ethyl ketone. After stirring for 3 to 5 minutes, a finely divided stable pigment dispersion was obtained and, after addition of a polyisocyanate prepared by reaction of 1 mol trimethylol propane and 3 mol tolylene diisocyanate and a heavy metal salt as accelerator, was suitable for the coating of textiles by the reverse roll coating or direct coating process. The polyurethane films produced by this method are uniformly colored and free from specks.

USE EXAMPLE V3

Pigmenting of a Cellulose-Acetobutyrate Lacquer 40 g of the titanium dioxide preparation cf Example A2 were added to a solution of 25 g cellulose acetobutyrate (butyryl content 49%, viscosity in the form of a 20% solution in acetone at 20° C. approx. 20 Pas), 5 g di-n-butyl phthalate, 4 g n-butyl stearate, 2 g of a poly-

TABLE 3

| Example | Pigment forming agent of Example | [g] | Pigment | [g] | Methoxy-propyl acetate [g] | Dissolver [mins.] | Bead mill [mins.] | Viscosity [mPa · s/23° C.] | Evaluation[2] |
|---|---|---|---|---|---|---|---|---|---|
| A3 | 1 | 33 | Carbon black ® Elftex 125 | 25 | 41.5[1] | 40 | 60 | 4,000 | Approx. 10% stronger than comparison |
| A4 | 1 | 32 | ® BAYFERROX 180 M | 60 | 8 | 40 | 20 | 4,500 | Approx. 15% stronger than comparison |
| A5 | 5 | 33 | P. Violet 23 ® HELIOECHT Red-violet EB | 16 | 51 | 60 | 40 | 1,400 | Approx. 25% stronger than comparison |
| A6 | 2 | 35 | Carbon black ® Elftex 125 | 25 | 40[1] | 40 | 55 | 4,300 | Approx. 40% stronger than comparison |
| A7 | 3 | 30 | Carbon black ® Elftex 125 | 25 | 44.5[1] | 30 | 60 | 5,000 | Approx. 50% stronger than comparison |

[1] +0.5 g 2-aminoethanol
[2] All the binders were dispersed in the described manner and compared with a preparation according to Example 1 of DE-OS 2 801 817 and evaluated.

III. USE EXAMPLES

EXAMPLE V1

Pigmenting of a One-Component Polyurethane 8 g of the titanium dioxide pigment preparation of Example A2 were added to a solution of 25 g of a polyurethane in 45 ml dimethyl formamide and 30 ml methyl ethyl ketone while stirring with a high-speed stirrer at a rotational speed of 200 to 300 r.p.m. After stirring for 3 to 5 minutes, a finely divided stable pigment dispersion was obtained which was eminently suitable for coating textiles by the reverse roll coating process. The polyurethane films produced by this method on textiles were uniformly colored and free from specks. The one-component polyurethane used had been prepared from a polyester of adipic acid/hexanediol/neopentyl glycol, with an average molecular weight of 1,800, and diether siloxane (prepared in accordance with DE-OS 32 44 995, Example 1A), 104 g 2-ethyl-n-hexyl acetate, 410 g methoxypropanol and 410 g n-butyl acetate. After stirring for 5 minutes, a ready-to-use white lacquer was obtained, which had good spraying properties and very strong hiding power. It was light-stable, amine-resistant and stable to yellowing at up to 170° C. The lacquer was particularly suitable as a highly opaque white finish for buffed and full-grain leathers.

USE EXAMPLE V4

Pigmenting of a Collodion Lacquer 50 g of the pigment preparation of Example A5 were added with stirring to a solution of 32 g of an ester-soluble collodion wool (butanol-moist, 65%, standard type 9E), 40 g di-n-butyl phthalate and 15 g castor oil in 50 g 2-ethyl-n-hexyl acetate and 813 g butyl acetate. A deeply violet-colored collodion lacquer was obtained after stirring for 5 minutes and, when sprayed with an air spray gun, was particularly suitable as a high-gloss decorative lacquer on buffed and full-grain fashion leathers.

USE EXAMPLE V5

Example of the Coloring of a Polyurethane Finish 100 g of a 30% aliphatic polycarbonate polyurethane urea prepared in accordance with GB-A-1,418,550 were mixed with 15 g of the pigment preparation of Example A4 according to the invention in a mechanical stirrer and applied to an embossed silicone release paper by means of a fixed coating knife. Coverage 30 g/m² solids.

After passing through a drying tunnel heated to 80 to 125° C. and cooling, the hiding power was compared with another similarly prepared pigment preparation. The pigment preparation according to the invention showed improved coloring strength in relation to a comparison paste according to Example 1 of DE-OS 2 801 817.

USE EXAMPLE V6

Coloring of a High-Solids Polyurethane Finishing Paint 1,000 g of a blocked NCO prepolymer prepared in accordance with DE-OS 2 902 090, Example 1, were in each case mixed with 50 g of the pigment preparation of Examples A1 and A4 and 90 g 3,3'-dimethyl-4,4'-diaminodicyclohexyl methane in vacuo, while simultaneously heating to 40° C. Coverage 200 g/m² solids. Crosslinking temperature: 150 to 160° C. The above-described blocked NCO prepolymer with added diamine was used as primer. Quantities of 25 g of the pigment preparations of Examples A1 and A4 and 200 g of a 40% PUR dispersion and 30 g of a water-soluble silicone oil were thoroughly mixed in a disperser.

The paste obtained, which is stable in storage for prolonged periods at room temperature, was directly applied to an embossed release paper in one instance, to a silicone matrix in another instance and also to an endless steel belt. All these temporary substrates may have one or more layers consisting of the above-described products or of other chemicals (for example acrylates). The products were applied by means of a known coating unit (coating knife, spray gun, pressure roller etc., and, immediately afterwards, endless material in the form of a woven fabric, knitted fabric, nonwoven or coagulated fabric was laminated onto the substrate, passed through rollers consisting of different materials (metal, rubber or hard paper or foam) and introduced into a drying tunnel heated by recirculating air to between 130 and 170° C.

At the end of the dryer, the coating was cooled over rollers and removed from the temporary substrate which can be reused. Even after thermal ageing, there was no "writing" effect through migration.

USE EXAMPLE V7

Pigmenting of a Highly Reactive Polyurethane Urea

In a coating unit, 342 g (262 mmol NCO) of a prepolymer of neopentyl glycol/hexanediol polyadipate and tolylene diisocyanate in the form of an 80% solution in toluene were processed with 425 g (250 mmol) of the hardener solution described below by means of a two-component mixing gun of the type described, for example, in U.S. Pat. No. 4,310,493:

| | |
|---|---|
| 147 parts | 1,1-bis-(4-amino-3-methylphenyl)-cyclohexane |
| 139 parts | 3-methyl-2,4-diaminobenzoic acid (2-ethyl-hexyl)-ester |
| 2,800 parts | ethyl acetate |
| 150 parts | of a prepared carbon black pigment according to Example A3 |
| 65 g | of a polyether polysiloxane having the following idealized formula |

$$CH_3-Si\begin{matrix}O-[(CH_3)_2SiO]_5-Si(CH_3)_2-CH_2-O-(R-O)_m-C_4H_9\\O-[(CH_3)_2SiO]_5-Si(CH_3)_2-CH_2-O-(R-O)_m-C_4H_9\\O-[(CH_3)_2SiO]_5-Si(CH_3)_2-CH_2-O-(R-O)_m-C_4H_9\end{matrix}$$

in which m is an integer of between 27 and 35 and R represents ethylene and propylene radicals.

Split leather, textile fabrics and nonwovens were reverse-roll coated using a PUR gun spraying machine of the type described, for example, in U.S. Pat. No. 4,310,493.

The prepolymer was introduced into the heatable storage tank and was heated to 70.C to reduce its viscosity. The hardener preparation was introduced into the tank intended for it. The prepolymer and hardener preparation were delivered to the gun through separate feed lines with intermediate metering units. The quantities delivered can vary according to the ratio between the equivalent weights of NCO:NH of between 1 and 1.75 (NCO/NH=1.08 in the present test). The throughput was variable and was determined by the required layer thickness as a function of the surface area coated per unit of time (layer thickness 0.28 mm in the test). The constituents of the reaction mixture was intensively mixed very quickly in the mixing compartment and in the mixing tube of the two-component PU spray gun and were sprayed through the outlet nozzle by means of compressed air. The reaction of the components began immediately, i.e. during the actual mixing process.

On leaving the gun, the mixture was additionally mixed by air currents produced by compressed air (operating pressure 3 to 6 kg/m²; 4.5 kg/cm² in the test) and the conical shape of the spray jet was converted into a flat jet. The gun traversed a silicone rubber matrix with the appearance of natural leather or other temporary support approximately 30 times per minute over a width of 150 cm. The temporary support was moved underneath the gun at a rate of 4.5 meters per minute. The mixture sprayed onto the matrix or temporary support formed a film. The split leather or other substrate to be coated was placed on or in the reacting mixture and subjected to light pressure. The coating as a whole then passed through a drying tunnel heated to 80° C. After about 5 minutes from the beginning of spraying, the coating was removed from the matrix or temporary support without sticking.

The coated flat material had a grain deceivingly similar to natural leather and, after a short time, was dry and could be stacked and processed, for example in standard shoe machines The adhesion between coating and split leather was excellent and the feel pleasantly dry and soft.

We claim:

1. A non-aqueous pigment preparation comprising (a) a pigment;

(b) 0.05 to 10 parts by weight, relative to the weight of the pigment, of a forming agent comprising an oligourethane having a molecular weight range of from 5,000 to 50,000, wherein said oligourethane contains
   (1) no primary or secondary amino groups, and
   (2) anionic and cationic groups, wherein the quantity of anionic groups is from 0.2 to 0.8 mol per 1000 g of the oligourethane and the molar ratio of anionic to cationic groups is from 0.8 to 4; and
(c) 0.2 to 20 parts by weight, relative to the weight of the pigment, of additives.

2. A non-aqueous pigment preparation according to claim 1 wherein 0.1 to 6 parts by weight, relative to the weight of the pigment, of the forming agent are used.

3. A non-aqueous pigment preparation according to claim 1 wherein additive (c) is an organic solvent, a formulating agent, a defoaming agent, a thickening agent, or a mixture thereof.

4. A non-aqueous pigment preparation according to claim 1 wherein the forming agent contains 0.25 to 0.7 mol of anionic groups per 1000 g of the oligourethane.

5. A non-aqueous pigment preparation according to claim 1 wherein the molar ratio of anionic to cationic groups in the forming agent is from 0.9 to 3.6.

6. A non-aqueous pigment preparation according to claim 1 wherein the oligourethane is a reaction product of a polyisocyanate, a hydroxyl compound, and an amino alcohol having tertiary nitrogen atoms.

7. A process for preparing a non-aqueous pigment preparation according to claim 1 comprising dispersing
   (a) a pigment in
   (b) 0.05 to 10 parts by weight, relative to the weight of the pigment, of a forming agent comprising an oligourethane having a molecular weight range of from 5000 to 50,000, wherein said oligourethane contains
      (1) no primary or secondary amino groups, and
      (2) anionic and cationic groups, wherein the quantity of anionic groups is from 0.2 to 0.8 mol per 1000 g of the oligourethane and the molar ratio of anionic to cationic groups is from 0.8 to 4; and
   (c) 0.2 to 20 parts by weight, relative to the weight of the pigment, of additives.

8. A method comprising pigmenting agents for leather and leather imitations and textile coating compounds with a non-aqueous pigment preparation according to claim 1.

* * * * *